Figure 1:
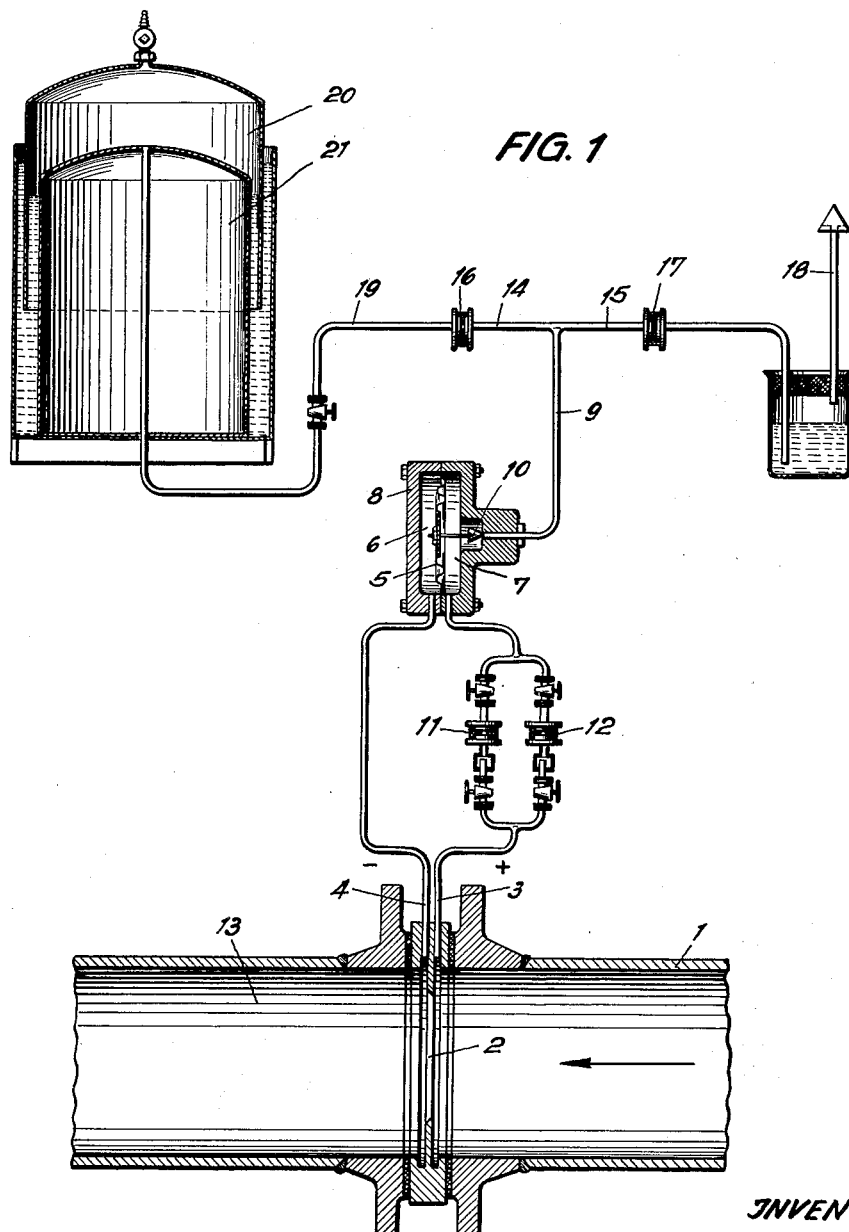

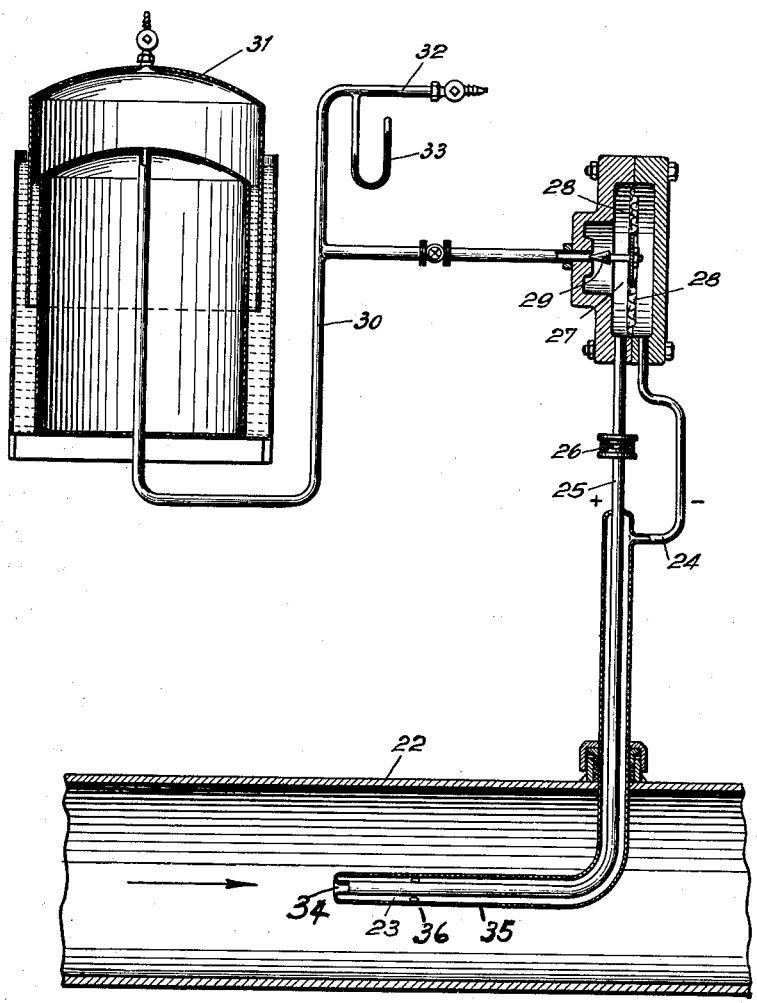

United States Patent Office 2,726,548
Patented Dec. 13, 1955

2,726,548

GAS SAMPLING DEVICE

Theodor van der List, Oberhausen-Holten, Germany, assignor to Ruhrchemie Aktiengesellschaft, Oberhausen-Holten, Germany, a corporation of Germany Application January 12, 1952, Serial No. 266,150

Claims priority, application Germany January 22, 1951

3 Claims. (Cl. 73—422)

This invention relates to a gas sampling device. It more particularly relates to a device for continuously removing a small proportional amount of the gas flowing through a pipe line for sampling purposes.

In the commercial sale of gas, samples are continuously withdrawn from the delivery lines in order to determine the average composition of a quantity of gas delivered over a period of time and to permit the calculations according to the gas quality and the heating value of the same. In the past it has been customary to effect this sampling with suction vessels which, with the use of a running-off liquid or a float continuously pass a small portion of the gas stream into a measuring vessel or aspirator. The content of this measuring vessel is used for the gas analysis which gives the average composition of the quantity of gas delivered during the period of time over which the sample was collected.

As is known, the amount of gas, such as, for example, of the number of cubic meters at normal pressure and temperature which flows through a pipe line of a given cross-sectional diameter in a given period of time is dependent upon the flow velocity, the pressure, and the temperature of the gas. Since the sample withdrawn at the time of its withdrawal has the same temperature as the corresponding gas flowing through the pipe lines, this factor need not be taken into consideration. However, the known devices for continuously drawing samples of gas from pipe lines do not take into consideration any fluctuations in the gas velocity flowing through the lines nor fluctuations in the gas pressure. For this reason the amount of gas being withdrawn as a sample is not continuously proportional to the amount flowing through the pipe lines and an analysis of this sample taken over a period of time will not give a true average composition of the gas passing through the line. This results in considerable inaccuracies in an analysis, especially where variations in the flow velocity and pressure in the gas line have occurred. In the case where a gas line is fed by one or several suppliers, these fluctuations usually arise and a stopping or even reversed flow of the gas stream may occasionally occur. In addition, these known devices are complicated and very susceptible to breakdowns and troubles.

One object of this invention is a device for the continuous sampling of gas from pipe lines without the above-mentioned difficulties. A further object of this invention is a device which will continuously withdraw a small proportional amount of the gas flowing through a pipe line irrespective of pressure and velocity fluctuations.

A further object of this invention is a device for the continuous sampling of gas from pipe lines which will not withdraw any gas when the flow through the pipe line stops or reverses. This and still further objects will become apparent from the following description read in conjunction with the drawings in which:

Fig. 1 diagrammatically shows a vertical section of a device for the continuous sampling of gas from pipe lines in accordance with the invention, and Fig. 2 diagrammatically shows a vertical section of another embodiment of a device in accordance with the invention.

In accordance with the invention, means which will cause a pressure differential to occur depending on the flow velocity of the gas, is inserted in a cross-section of the pipe line from which the gas samples are to be continuously withdrawn. This may consist of any throttling device positioned in the cross-section of the pipe, such as an orifice flange, valve, slide valve or the like. The means for effecting a pressure differential dependent on the velocity of the gas flow may also consist of a Pitot tube or the like. These devices will be referred to herein and after and in the claims as throttling means which is generically intended to include all such known devices for effecting a pressure differential in a gas pipe dependent on the rate of flow of the gas through the pipe. A separate small-diameter tube is connected to each pressure side of the throttling means, such as, for example, one to each side of an orifice flange positioned in the cross-section of the gas pipe line. The small diameter tubes are connected to two separate chambers of a measuring box which is divided by a diaphragm. The diaphragm is connected for controlling valve means such as a conical valve positioned for closing and controlling an opening leading out of one of the chambers of the measuring box. This chamber of the measuring box is connected by the tube to the side of the throttling means in which the relatively higher pressure is developed during the normal course of the gas flow through the pipe line. The opening out of the chamber of the measuring box is connected to a sample gas holder, so that small quantities of gas, dependent on the gas velocity and pressure in the pipe line or gas main will flow over into this sample gas holder.

In accordance with the preferred embodiment of the invention, a throttle opening is defined in the branch tube leading off before the throttling means in the gas main and leading to the partial chamber provided with the valve and opening. Due to the movable diaphragm and the valve controlled thereby, both chambers in the measuring box will have the same gas pressure. Due to this, the side of the throttling opening in the tube of small diameter in direct communication with the partial chamber of the measuring box having the valve means will have the same pressure as is present in the back of the throttling means in the normal direction of gas flow through the main. The side of the throttling opening in the small diameter tube in direct communication with the front of the throttle means in the normal direction of gas flow in the gas main will have the same pressure as is present on this side of the throttling means. Due to this, the same pressure differential will exist between each side of the throttling means positioned in the cross-section of the gas main and each side of the throttle opening in the tube of small diameter connecting the chamber of the measuring box with the valve to the front side of the throttling means of the gas main. The amount of gas which flows through the throttle opening in the small diameter tube will be proportional to the amount of gas flowing through the throttling means in the main gas line in direct ratio to the sizes of the cross-sectional openings in these two places.

Since the gas passage cross-section of the throttling opening defined in the tube which forms the branch line to the measuring box is small, corresponding to the relatively small quantity of sample gas desired, it has been found advisable to provide this branch line with two alternately operated throttling openings to prevent dirt deposits in these openings. Thus, one of the branch lines is closed off for the cleaning of the nozzle or the filters installed before the nozzles while the other is in operation. This allows cleaning at regular intervals without affecting the sampling.

In order to avoid too small a cross-section of the throttling opening in the branch line and to eliminate any undesirable delay in the sampling, the line which leads from the opening in the chamber of the measuring box to the sample gas holder may be branched with the use of throttling openings so that only a reduced part of the gas is passed to the sample gas holder.

The invention will be explained in greater detail with reference to the embodiments shown in the accompanying drawings.

With reference to Fig. 1, throttling means consisting of an orifice flange 2 of usual construction, is positioned in the cross-section of the gas line or main 1, from which gas samples are to be continuously withdrawn. The throttling means may consist of any other suitable device, such as a slide valve, a valve or Pitot tube. Before and after the orifice flange 2 or any of the throttling means which may be used in its place, two tubes of small diameter 3 and 4 are branched off. These tubes, which will be referred to as branch tubes, lead to partial chambers 6 and 7 of the measuring box 8. The chambers 6 and 7 are separated from each other in the box by an easily movable diaphragm 5.

Partial chamber 7, which will be referred to as the valve chamber, is connected by branch line 3 to the main just before the orifice flange 2. A flow-off opening is defined in this valve chamber to which is connected the flow-off line 9. The flow-off opening in the valve chamber 7 may be opened to varying degrees and closed by the valve cone 10 which is connected to the diaphragm 5. Instead of this valve cone 10, any known means for varying and closing an opening may be employed in conjunction with the diaphragm 5.

If the gas stream flows through the main 1 in the direction indicated by the arrow, a differential pressure will arise at the faces of the orifice flange 2, i. e., the pressure before the flange will be higher than the pressure after the flange and thus the pressure in the branch line 3 will be higher than in the branch line 4. This pressure difference is transferred through the lines 3 and 4 to the two measuring chambers 6 and 7 which results in a deflection of the diaphragm 5 toward the chamber 6. This will cause the valve 10 to open and release gas from the valve chamber 7 until the pressures in chambers 6 and 7 are equal. Gas being released at the valve 10 will flow off through the line 9. If the gas stream in the main 1 is stopped, there will be no pressure differential on the opposite sides of the orifice flange 2 and the pressure will be the same in the lines 3 and 4. With the opening at the valve 10 the pressure will be greater in the partial chamber 6 which will move the diaphragm and close the valve 10, causing an equal pressure in the chambers 6 and 7 and preventing any gas flow through the line 9.

If a throttle opening such as in the form of the orifice 11 is defined in the branch line 3 which is connected in front of the orifice flange 2, the same differential pressure will always rise at this orifice 11 as at the main orifice flange 2. This identical pressure differential occurs because the operation of the diaphragm 5 in conjunction with the valve 10 as described above, always assures that the pressures in the chambers 6 and 7 will be equal. Since the pressure in the chamber 6 is identical to the pressure behind the orifice flange 2, since it is connected by the branch line 4 to this point, the pressure of the side of the orifice 11 connected to the chamber 7 will be identical to pressure behind the orifice flange 2. The other side of the orifice 11 is in direct communication by means of the branch line 3 to the front of the orifice 2 and therefore has the same pressure as exists in front of this orifice. With this equal pressure differential at the orifice flange 2 and at orifice 11 the amount of gas flowing through these orifices will correspond exactly to the ratio of their cross-sections, respectively. Thus, the ratio of the quantity of gas flowing through the gas main to the quantity of sample gas let off is proportional to the ratio of the free cross-section of the orifice flange 2 to the free cross-section of the orifice 11.

If, for example, the diameter of the orifice flange 2 is 400 mm. and that of the orifice 11 is 2 mm., then one-forty thousandth of the gas quantity flowing through the main will flow through the orifice 11, provided that the flow values of these orifices are equal, which may be obtained without difficulty.

Since the diaphragm 5 and the valve cone 10 causes the gas to flow from the chamber 7 through the line 9 at the pressure prevailing in the gas main 1, and this gas is released from the gas line 9 at normal pressure. In this manner one measures the gas pressure present in the gas main 1. This is so, since in this gas release, the gas volume increases accordingly and is measured in the gas meter 20—21 under normal conditions.

Since the sampling should occur, if possible, without any great delay, the partial quantities of gas drawn through the line 9 are generally too large to allow storage in a relatively small sample gas holder over a long period of time. To avoid delays and too small an opening at orifice 11, it has been found advantageous to fork the line 9 once more into two lines 14 and 15 in which throttling devices 16 and 17 are located. By means of these throttling devices it is possible to split up the gas stream in such a way, for example, that 90% of the gas quantity is continuously blown off through line 18, while 10% of the sample gas quantity taken off passes over into the sample gas holder 20. In this way it is possible to accumulate a gas stock, the composition of which corresponds to the average composition of the gas quantity delivered through the line 1 over a long period of time, even in the case of fluctuations in flow velocity and pressure. The gas holder 20 may have any conventional known construction and is preferably provided with the inner dome 21 which minimizes the contact of the sample gas with the sealing liquid.

The gas sampling, in accordance with the invention, is thus effected in such a way that the samples are collected in quantitative dependence on the amount of gas flowing through the gas main and are released to atmospheric pressure simultaneously with the sampling. This, for the first time, allows sampling taking into account both the differences in velocity and in pressure occurring in the lines through which the gases are flowing.

No gas sampling is effected in accordance with the invention when the gas stream stops flowing or reverses its flow.

It has been found advantageous if the branch line 3 connecting the front of the orifice flange 2 and the valve chamber 7 is constructed with two alternate identical flow lines, either of which may be used. As is shown in Fig. 1, two identical throttling orifices 11 and 12 may be used which are alternately switched off and operated. As soon as one of these throttling orifices becomes dirty, it is closed off and the other is switched into use, so that the first may be cleaned. For further dependable operation the throttling devices 11 and 12 may be provided with dirt traps which are alternately switched off at regular intervals for cleaning.

As already mentioned, any throttling means such as slide valves, valves, cocks, etc. which will cause a local throttling of the gas stream and a pressure differential depending on the flow velocity may be used in place of orifice flange 2. A Pitot tube has been found very expedient for this purpose. Such an embodiment of gas sampling device in accordance with the invention is shown in Fig. 2.

The Pitot tube 23 is inserted in the cross-section of the gas main 22 with its opening 34 centered in the center of the cross-section of the line 22 directly in the path of the gas stream. The Pitot tube 23 has a closed jacketed portion 35 in communication with the gas in the gas main through the small holes 36. The branch line 25 is connected with the open end 34 of the Pitot tube and to the valve chamber 27 of the measuring box. The jacketed portion 35 of the Pitot tube is connected by means of the branch line 24 to the partial chamber of the measuring box for the other side of the diaphragm 28. The pressure in the branch line 25 consists of both the static and dynamic gas pressure when the gas is flowing in the main tube in the direction of the arrow. This pressure when the gas is flowing is higher than the gas pressure in the branch line 24. An orifice opening 26 is positioned in the line 25 which in the same manner as the orifice opening 11 in Fig. 1 has a pressure differential equal to the pressure differential between the inner tube of Pitot tube 23 and the outer jacket. In this manner the gas quantity may be continuously blown off from the chamber 27 by the valve cone 29 controlled by the diaphragm 28, which is dependent on the opening cross-section of the orifice 26 and which always has a quantitative relation to the gas quantity flowing in the line 22. This quantity of gas passes through the line 30 into the gas holder 31. A differential manometer 33 may be installed in the sampling line 32 for observing the total pressure.

In Figs. 1 and 2 the diaphragms 5 and 28 respectively should be constructed so that they exert little or no elastic force in any operable position. The orifice flow values of the orifices 11 and 12 in Fig. 1 and 26 in Fig. 2 depend on the geometric form and arrangement and may be easily determined by practical measuring. These orifices besides ensuring that the gas flow through the branch line is proportional to the gas flow in the main conduit, have the further advantage of reducing the volumetric quantities of the drawn gas samples as far as possible in a proportional manner.

I claim:

1. A device for continuously withdrawing a proportional amount of sample gas from gases flowing through a gas main for collection in a sample gas holder, which comprises throttling means positioned in a cross-section of such a gas main, means defining an enclosed chamber, diaphragm means subdividing said enclosed chamber into two partial chambers, there being an opening in a wall of one of said partial chambers, a sample gas holder, branched pipe means with one branch thereof connecting said opening to said sample gas holder, and the other branch thereof connecting said opening to the atmosphere, means defining a throttle opening in each branch of said branch pipe means, valve means connected to said diaphragm positioned in said one of said partial chambers for opening and closing said opening in said partial chamber upon actuation by said diaphragm means, a branch pipe line connecting said valve-containing partial chamber to the gas main in front of said throttling means, means defining a throttle opening positioned in said last mentioned branch pipe line, and a substantially throttle free branch pipe line connecting said other partial chamber to the gas main behind said throttling means.

2. Device according to claim 1, in which said branch pipe line connecting said gas main to said valve-containing partial chamber is divided into two parallelly connected branches, each having means defining a throttling orifice and valve means for opening and closing said branch.

3. Device according to claim 1, in which said throttling means consists of a Pitot tube having a jacket in gas communication with said gas main, and in which said branch line connected to said valve-containing partial chamber is connected to the central opening in said Pitot tube, and in which said branch gas line connected to said other partial chamber is connected to said jacket.

References Cited in the file of this patent

UNITED STATES PATENTS

| 944,417 | Connet | Dec. 28, 1909 |
| 1,364,035 | Carter, Jr. | Dec. 28, 1920 |
| 1,381,139 | Smoot | May 14, 1921 |
| 1,726,463 | Wunsch | Aug. 27, 1929 |
| 1,944,339 | Wunsch | Jan. 23, 1934 |
| 2,085,224 | Krueger | May 29, 1937 |
| 2,452,143 | Pellettere | Oct. 26, 1948 |
| 2,592,464 | Plank | Apr. 8, 1952 |

FOREIGN PATENTS

| 433,549 | Germany | Sept. 2, 1926 |
| 522,515 | Germany | Apr. 10, 1931 |